Jan. 27, 1970  J. W. HERRING  3,492,027
REMOTE CONNECTION RELEASE

Filed March 11, 1968  4 Sheets-Sheet 1

Fig. 1

Joe W. Herring
INVENTOR.

BY
Bill B Berryhill
ATTORNEY.

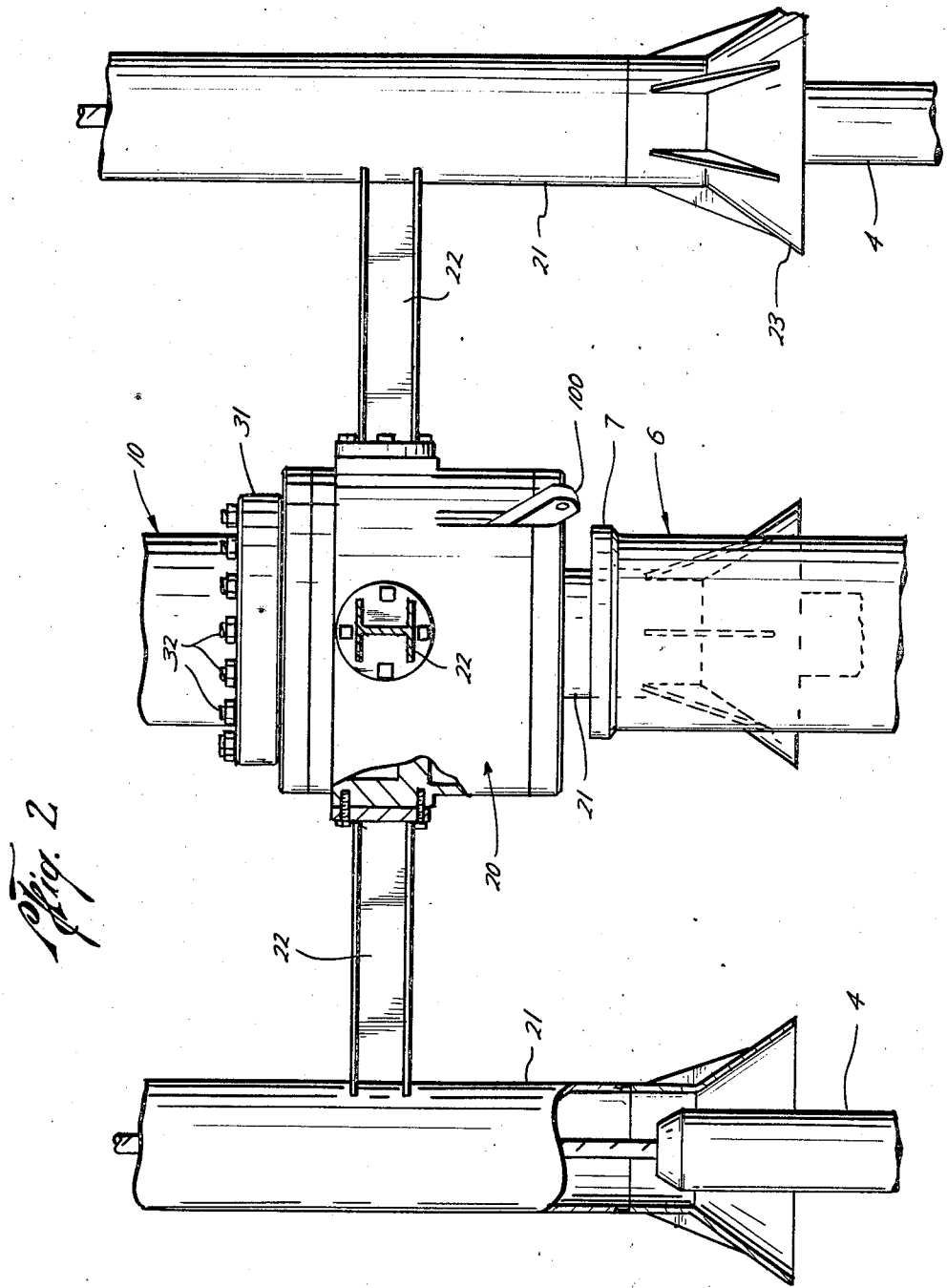

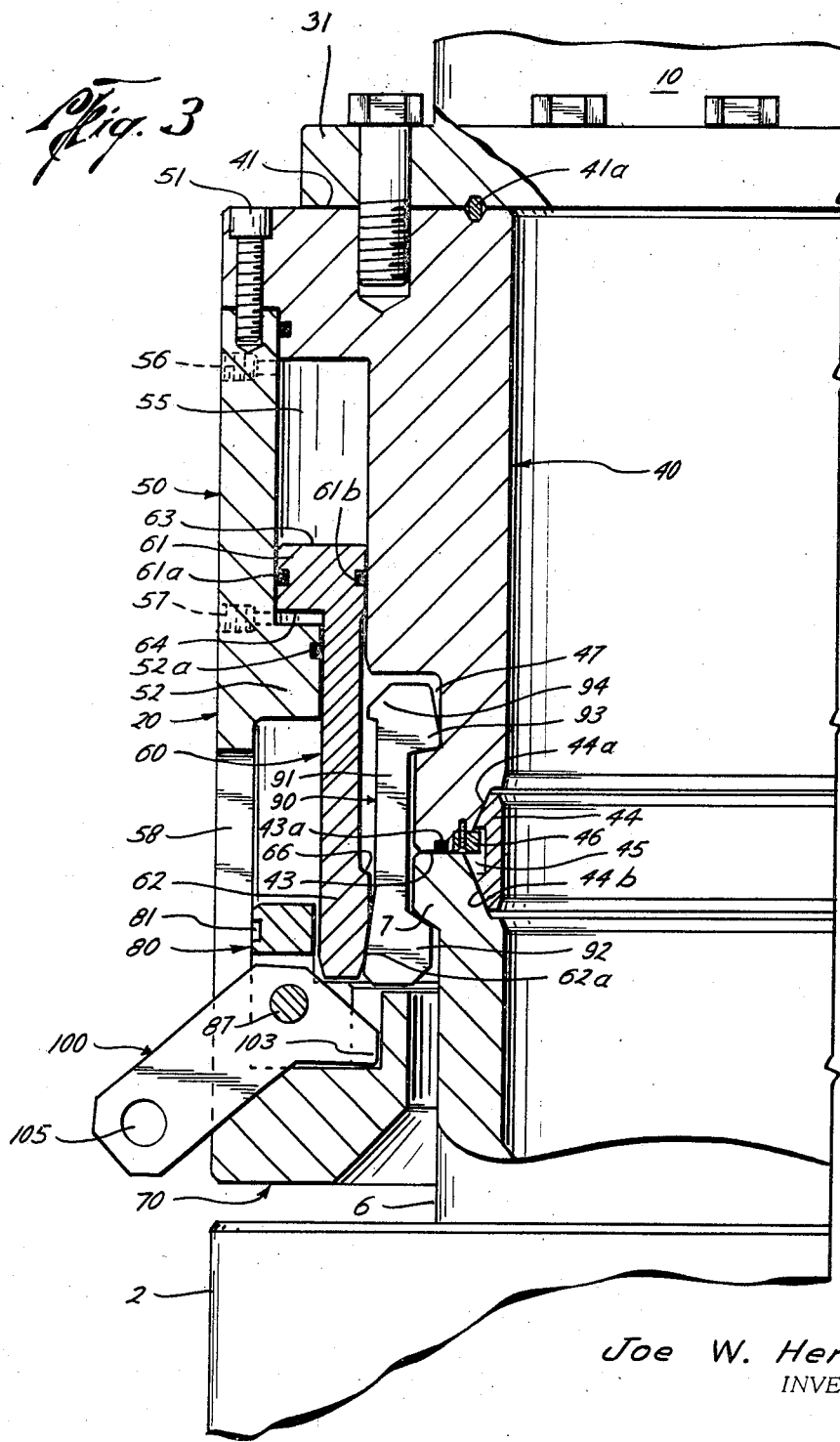

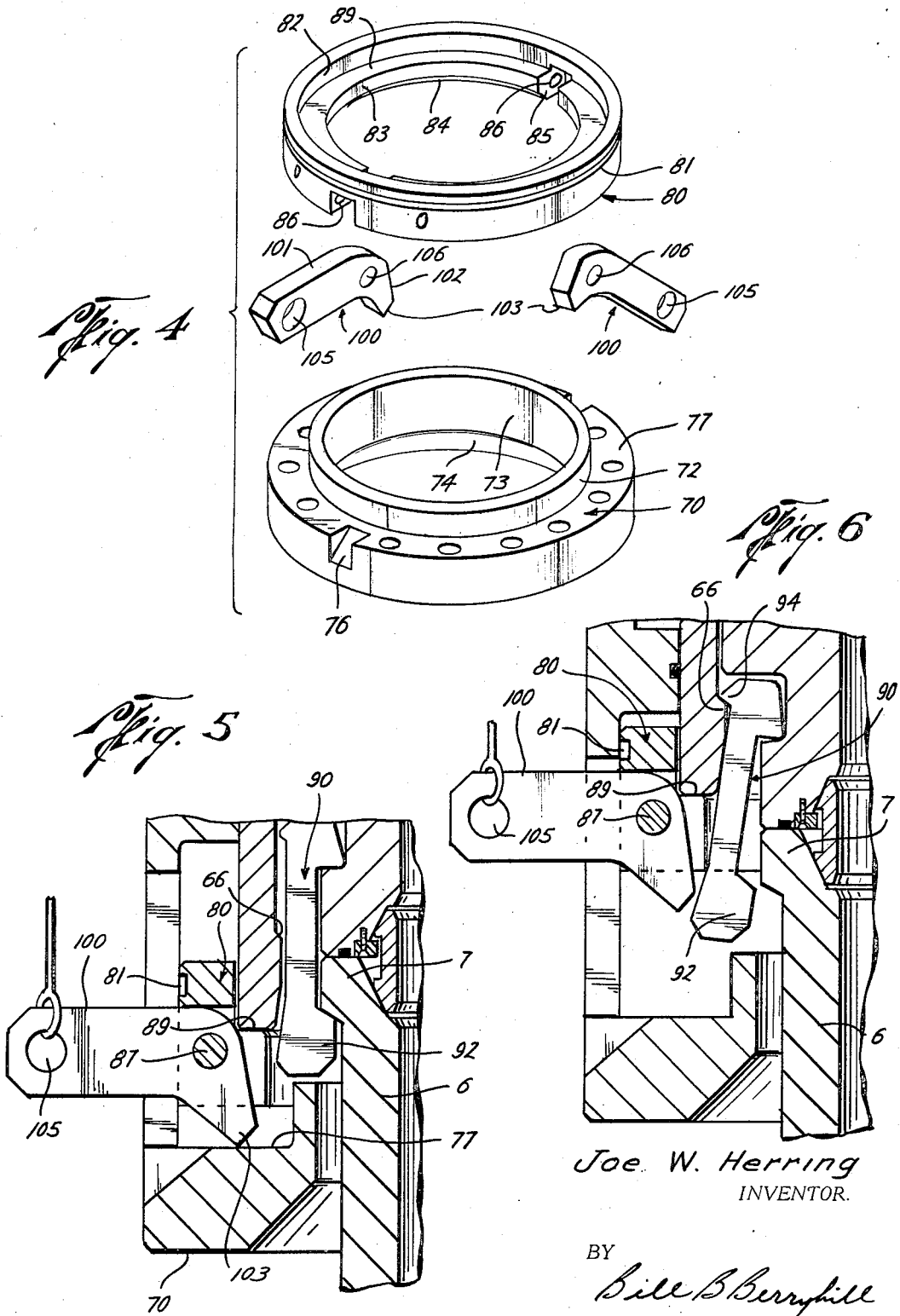

United States Patent Office 3,492,027
Patented Jan. 27, 1970

3,492,027
REMOTE CONNECTION RELEASE
Joe W. Herring, Houston, Tex., assignor to Rockwell Manufacturing Company, Houston, Tex., a corporation of Pennsylvania
Filed Mar. 11, 1968, Ser. No. 712,132
Int. Cl. F16l 55/00, 35/00
U.S. Cl. 285—18          14 Claims

ABSTRACT OF THE DISCLOSURE

A mechanical release means for releasing latch means of a remote connector connected to an underwater wellhead. The release means comprises a thrust ring and leverlike cam means pivotally attached thereto. The cam means is so designed that by applying a force to one of its ends a substantially greater force, based on the principles of a lever, is transmitted through the thrust ring to a portion of the connector latch means to release the latch means for disengagement from the wellhead.

BACKGROUND OF THE INVENTION

Field of the invention

This invention concerns drilling and completion of underwater petroleum wells. More specifically it relates to remote connection equipment used in drilling and completing these wells.

Description of the prior art

Increased activity in underwater drilling for oil and gas deposits over the past few years has resulted in the development of a number of new methods and a large variety of equipment for performing these methods. Most of these methods and equipment are aimed at reducing the dependence on divers and decreasing the time and money normally associated with underwater development.

A great deal of effort and money has been spent by various manufacturers in developing remote connectors for engaging underwater wellheads to provide flow communication between various well components. One such remote connector is disclosed in United States Patent No. 3,330,341—J. G. Jackson et al., issued July 11, 1967.

Many of these remote connectors utilize hydraulic pressure to latch or unlatch the remote connector to a wellhead, or such, in fluidtight flow communication therewith. One such connector is shown in United States Patent No. 3,321,217—A. G. Ahlstone, issued May 23, 1967.

Although hydraulic systems are very effective in this application, they are inherently subject to operational failure. Fluid lines, hydraulic seals, and other components of such systems are occasionally damaged to such an extent that operation of a remote connector may become impossible through hydraulic means.

It may also be desirable to interrupt hydraulic power to an underwater connection and rely on other means for operation. For example, this may be true in a completed well which may not require connector operation for months or even years after completion.

Various secondary mechanical devices have been devised for nonhydraulic operation of such connectors. However, due to the large forces involved it is difficult to design a mechanical device to take the place of a hydraulic system.

SUMMARY OF THE INVENTION

The present invention involves a mechanical emergency release for use with a hydraulic remote connector when hydraulic power fails or is purposely removed. This device may be used on remote connectors for attaching blowout preventor stacks or Christmas trees to underwater welheads or any other remote connector application which may require such a device.

The particular embodiment of the invention disclosed herein is used with a remote connector which includes a hydraulic latch cylinder longitudinally movable to engage or disengage a plurality of connector latches. These latches are laterally movable to engage or disengage the flange of a conduit, such as a wellhead, for fluidtight communication therebetween.

The mechanical release means of the invention is designed to exert a longitudinal force against the latch cylinder when hydraulic means are inoperable to allow the connector latches to disengage the conduit to which the connector is connected.

Basically, the release mechanism comprises a retainer ring stationarily affixed to the remote connector and a thrust ring and lever-like cam members mounted above the retainer ring for limited longitudinal movement to engage the bottom of the hydraulic latch cylinder. The cam members are so designed that, through lever principles, a substantially greater force may be exerted against the latch cylinder than the force applied through cables or the like to the cam lever from the water body surface. This greater force allows disengagement of wedged latch parts which might not be disengaged otherwise.

BRIEF DESCRIPTION OF THE DRAWINGS

FIGURE 1 is a pictorial representation of an underwater well installation showing the wellhead, a Christmas tree and a remote connector for remotely connecting the tree to the wellhead;

FIGURE 2 is an elevation partially in section, showing the remote connector and tree of FIGURE 1 being lowered into position for connection with the wellhead of FIGURE 1;

FIGURE 3 is a half-elevation, partially in section, of the remote connector of FIGURE 2, showing one embodiment of the invention;

FIGURE 4 is an exploded isometric view of the release mechanism for the embodiment of the invention shown in FIGURE 3; and FIGURES 5 and 6 are partial elevations in section of the remote connector of FIGURES 2 and 3 showing the same embodiment of the invention at different stages of disengagement.

DESCRIPTION OF THE PREFERRED EMBODIMENT

Referring first to FIGURE 1, an underwater wellhead and related equipment are shown for well completion near the floor 1 of a body of water. A conductor casing 2 is shown with a landing base 3 welded thereto. Guide columns 4 firmly affixed to landing base 3, extend upwardly from base 3, their axes being parallel to the axis of the well bore. Guide cables 5, attached to the ends of guide columns 4, extend to the surface (not shown) where they are attached to a work platform during drilling completion or work-over operations. After completion of the well, cables 5 may be removed or buoyed for future use. If removed they may be re-installed for future use.

Normally, in this type of installation, after conductor 2 and landing base 3 are installed, drilling proceeds for the installation of a smaller casing string, such as 6 shown in FIGURE 1. During this period of time drilling control equipment may be attached to the upper end of conductor 2 by a remote connector similar to the one which will be described subsequently. After further drilling, production tubing may be strung and suspended within the head of casing 6. Then a production tree would be connected to the head of casing 6 in flow communication with the production tubing of the well.

In FIGURE 1, a production tree, designated generally at 10, is shown lowered into position and remotely connected to the well by remote connector 20. Remote connector 20 will be more fully described hereafter.

To guide tree 10 and remote connector 20 into position, guide tubes 21 are connected by structural supports 22 to connector 20. Cables 5 pass through the tubes 21 and initially guide tree 10 and connector 20 as they are lowered toward the ocean floor. Bell bottoms 23 provide final alignment as tubes 21 engage guide columns 4.

Production tree 10, as shown, is a dual completion tree. A single completion or other multiple completion may just as easily be performed with the present invention, the dual tree being for descriptive purposes only. Production tree 10 includes master valves 11, swab valves 12, diverter valves 13, and a valve selector 14 which is hydraulically connected (not shown) to a remote control station to control operation of the various valves shown. Such a valve selector is described in co-pending patent application U.S. Ser. No. 587,892 filed by John H. Fowler and David P. Herd and assigned to the assignee of the present invention.

Connected to the dual strings of tree 10 are flow loops 25 with Y valves 26 and cross-over valve 27. Cross-over valve 27 is normally closed. However, during "pigging" operations to clean out flowlines it may be opened to allow reversal of flow in flow loops 25 so a "pig" which has entered the flow loops may be returned to its launching point. Dual flow lines 30 are connected to loops 25 by flanges 29 or any other suitable means. Remote flow line connections have recently been developed for use. It is not the purpose of this application to discuss such equipment. Flow lines 30 run along the floor 1 of the body of water to a gathering station on shore or at a platform some distance away.

It is to the remote connector 20 that the description will now be directed. Referring now to FIGURE 2, an elevation partially in section, remote connector 20 is shown in a position just above casing head 6 to which it is to be connected. Guide tubes 21 with their bell bottoms 23 have just engaged guide posts 4 which are attached as shown in FIGURE 1 to the landing base. Connector 20 is properly positioned by virtue of its connection to guide tubes 21 through structural members 22. A portion of production tree 10 is shown attached to the upper end of connector 20 by flange 31 and studs 32.

Remote connector 20 will be lowered until it rests on casing head 6. Its latches will then be hydraulically activated to engage flange 7, providing flow communication between tubing strings (not shown) and Christmas tree 10.

If it is necessary to subsequently remove tree 10 for well maintenance remote connector 20 will be disengaged from casing head 6 and removed along with tree 10. Remote connector 20 may be designed for hydraulic disengagement. However, should the hydraulic means be inoperable for any number of reasons, a mechanical release means is provided. Lever-like cam 100, a portion of the release means, is shown projecting outwardly of remote connector 20. This cam and another one (not shown) disposed on the opposite side of connector 20 may be pulled upwardly by cables (not shown) to release connector 20 and tree 10 for removal. These cables may be installed by divers or installed during initial completion of the well and buoyed for future use.

Referring now also to FIGURE 3, a cross-sectional elevation, remote connector 20 will be described in more detail. As shown, connector 20 is connected to casinghead 6 which projects upwardly from conductor 2. Christmas tree 10 is attached above connector 20. It will be understood that the usual tubing nipples, packing elements and associated equipment would be installed between tree 10 and head 6. However, for simplicity these elements are not shown in the drawings.

Remote connector 20 comprises a body 40, case 50, drive piston 60, retainer ring 70, thrust ring 80, dog latches 90, and release cam 100. Body 40 has a generally cylindrical interior. Its exterior is formed by a number of cylindrical sections of various diameters. It has an upwardly facing flat annular surface 41 on which flange 31 and tree 10 rest, annular seal 41a sealing therebetween. A downwardly facing flat annular shoulder 43 rests on a mating surface of head 6. A primary seal between body 40 and head 6 is obtained with annular ring seal 44 which has inwardly converging frusto-conical surfaces 44a and 44b which mate with corresponding frusto-conical surfaces within body 40 and head 6. Seal 44 may be provided with an annular recess 45 around its exterior and held in place on head 40, as they are lowered into place, by a plurality of retainer lugs 46 inserted in notches cut in the lower annular face of body 40. O-ring 43a provides a secondary seal.

Case 50 generally surrounds body 40 in a concentric relationship therewith and is attached thereto by a plurality of cap screws 51. An inwardly projecting annular flange 52 is formed at approximately the middle interior of case 50. A pair of longitudinal slots 58, open at the lower end of case 50, are cut 180° apart through its wall. The purpose of these slots will be fully explained subsequently hereto.

Case 50 with its internal flange 52 and a portion of body 40 defined an annular pressure chamber 55 which receives a portion of drive piston 60. Piston 60 is a sleeve like member with a head portion 61 and a latch engagement portion 62. Head portion 61 has an upwardly facing annular pressure surface 63 and a downwardly facing annular pressure surface 64. Pressure ports 56 and 57 are provided through the wall of case 50 enabling hydraulic pressure to be selectively applied to either side of piston head 61. These ports 56, 57 would be connected by hydraulic lines (not shown) to a pressure source usually above the water surface.

O-ring 61a pressure isolates one side of the piston head 61 from the other. O-ring 52a and 61b seal chamber 55 against its exterior surroundings. Drive piston 60 is longitudinally movable from an upper position to the lower position in which it is shown in FIGURE 3.

Surroundng the lower portion of body 40 and retained thereto by annular recess 47 and drive piston 60 is a plurality of dog latches 90. Latches 90 are conveniently formed by machining an annular ring whose longitudinal cross-section conforms to the shape of dog 90 as shown. The ring is then cut into a number of segments, i.e. twenty-four, by making longitudinal saw cuts at regular intervals through the ring. Each segment then becomes one latch. Gaskets or spacers may be installed between each segment to keep the latches aligned and to prevent passage or build-up of deleterious materials.

Each latch dog 90 comprises a shank portion 91, an inwardly projecting lip portion 92, an inwardly projecting foot portion 93, and an outwardly projecting heel portion 94.

Normally before connection of remote connector 20 to head 6, pressure is applied to surface 64 through port 57 to force drive piston 60 to its uppermost position. In this position annular piston lip 66 engages the heel 94 of each latch dog and causes the dogs to pivot about foot 93 so that latch dog lips 92 move laterally and lie wholly outside the outer diameter of flange lip 7 on head 6. The connector 20 and tree 10 are then lowered into position resting on the upwardly facing surface of flange lip 7. Pressure is then applied to surface 63 through port 56 forcing drive piston 60 downwardly. The latch engagement portion 62 then engages the back of latch lip 92 forcing latches 90 laterally inward and causing latch lip 92 to engage flange lip 7 providing fluidtight communication between head 6, body 40, and tree 10.

The back of latches 90 have a slight upwardly converging taper, i.e., 7½° from the axis of connector 20. The internal surface of piston latch engagement portion 92 is also provided with a corresponding taper at 62a.

These tapers create a wedge or camming action and are self-locking so that normal vibrations or movement will not cause their disengagement.

Under normal operating circumstances, to remove connector 20 and tree 10 from head 6, pressure would again be applied through port 57 forcing drive piston 60 upwardly. This would release latch lip 92 for outward lateral movement which would be accomplished as heretofore explained in the initial step of installation.

Occasionally, however, a seal such as 52a, 61a, or 61b may fail rendering the hydraulic system useless. Or for various reasons hydraulic pressure may not be available to port 57. In such a case, if no other provisions were made, extremely difficult and costly removal problems would exist should disengagement of the remote connector 20 be desired.

An upwardly directed force may be mechanically applied to piston 60 for disengagement. However, since piston 60 and dogs 90 are wedged together, a prohibitive force may be required for initial disengagement. The applicant has arrived at a solution to this problem by designing a release mechanism which provides a substantial mechanical advantage on initial disengagement of piston 60 with latches 90.

Referring again to FIGURE 3 and also to FIGURE 4, the release mechanism comprises retainer ring 70, thrust ring 80, and a pair of lever-like cams 100. Retainer ring 70 is stationarily affixed to the bottom of case 50 by cap screws (not shown). It resembles a flange with a concentric annular sleeve 72 projecting upwardly therefrom. Its interior is formed by a cylindrical portion 73 and an upwardly converging flared portion 74 which aids in guiding the entire connector assembly into place. Two inclined slots 76 are machined at 180° intervals on upper face 77. Lever cams 100 rest in these slots in the engaged connector position shown in FIGURE 3.

Thrust ring 80, normally rests on face 77 of retainer ring 70 and generally surrounds sleeve 72. Its exterior is generally cylindrical in shape. An annular recess 81 is cut around the exterior to provide engagement means for shear screws (not shown) which are inserted through the wall of the connector case 50 to hold thrust ring 80 against premature movement from the normal position of FIGURE 3. The interior of thrust ring 80 comprises cylindrical section 82 joined to a smaller diameter cylindrical section 83 by upwardly facing annular surface 89, and upwardly converging frusto-conical section 84. A pair of slots 85 open at the bottom are radially cut in the wall of ring 80 diametrically opposed to one another. Holes 86 are tangentially drilled through the wall of ring 80 so as to intersect slots 85. One lever cam 100 will be mounted in each one of these slots 85 pivoting about a pin 87 inserted in holes 86.

Lever cam 100, made of a piece of metal plate, comprises a body portion 101 and a leg portion 102. Leg portion 102 includes a toe cam 103, the function of which will be more clearly understood subsequently. A hole 105 is provided near one end of body 101 for attaching a force transmitting means such as a cable. Another hole 106 is drilled near the intersection of body 101 and head 102. This hole 106 receives pin 87 to pivotally attach override cam 100 to thrust ring 80. A line passing through the center of holes 105 and 106 will intersect a line passing through the tip of toe cam 103 and the center of hole 106 at an angle of more than 90° but less than 180° moving from the first line to the second line in a counter-clockwise direction. As will be more fully understood later this produces a greater longitudinal movement of pin 87 and thrust ring 80 relative to the movement of hole 105 than would a straight lever.

To understand the operation of the release mechanism reference is made to FIGURES 3, 4, 5 and 6. FIGURE 3 shows the override mechanism in its resting or initial operating position. Cables or the like may be connected to both override cams 100 through holes 105 and an upward force applied thereto. This force first shears the shear screws which engage thrust ring 80, releasing thrust ring 80 and lever cam 100 for upward movement. Upwardly facing annular shoulder 89 then comes to bear against the lower end of drive piston 60. Since retainer ring 70 is stationary the toe cam 103 of lever cam 100 bears against its upwardly facing annular face 77. Thus, override cam 100 is a lever whose fulcrum is at toe 103. Therefore, an initial mechanical advantage is obtained equal to the ratio of the horizontal distance from toe 103 to hole 106 to the horizontal distance from toe 103 to pin 87. Thus, an initial force is exerted against the lower end of drive piston 60 through pin 87 and thrust ring 80 substantially greater than the force applied at hole 105 through the cables attached thereto. For the particular dimensions shown in the drawing this force is approximately two and one-half times the force applied to the cables. This assures the disengagement of piston 60 from the back of latch lip 92 which are wedged together. Furthermore, small cables and less force may be applied at the water surface. Since body 101 and leg 102 lie at the angles discussed heretofore, a smaller amount of lever travel is required than would be the case in a straight lever member.

Continued force is applied through the cables until the upper edge of cam body 101 contacts the upper edge of slot 85 in thrust ring 80. At this point the components of the release mechanism and remote connector are disposed as shown in FIGURE 5. A mechanical advantage no longer exists, the force applied to the cables now being equal to the force applied at pin 87. However, since the wedge engagement of piston 60 and dog latches 90 has been broken no mechanical advantage is needed.

Continued force on the cables will force thrust ring 80 and drive piston 60 to their uppermost positions as shown in FIGURE 6. Piston lip 66 will engage the heel 94 of each dog latch 90 causing the latch lips 92 to move laterally outward from engagement with flange lip 7 of casinghead 6. The remote connector 20 and Christmas tree 10 are now ready for removal from the wellhead.

Thus, it can be seen that with the present invention a simple effective means of releasing the connector is provided even though hydraulic pressure is not available. Through the use of the invention an initial force substantially greater than the force applied at the surface may be provided to disengage the connector latching means.

I claim:

1. A remotely operable coupling apparatus adapted to make connection with the end of a conduit comprising
  a body member having an opening therethrough and an annular surface adapted to abut a correlative annular surface on said end of a conduit,
  latch means carried by said body member movable to an operative position cooperating with latch engaging means carried by said end of a conduit to hold said body member to said conduit, and
  latch locking means carried by said body member comprising hydraulically operable sleeve means longitudinally movable to lock said latch means in said operative position,
  wherein the improvement comprises lever means carried by said body member in such a manner that a mechanical advantage is inherent in said lever means, said lever means adapted to transmit a longitudinal force, applied to said lever means, to said latch locking means in a predetermined increased proportion, through the mechanical advantage inherent in said lever means, to cause said sleeve means to move longitudinally to release said latch means for movement to said inoperative position.

2. The combination of claim 1 wherein said lever means and thrust means are mounted for limited longitudinal movement on said body member, said force being applied to said lever means and said increased proportion force being transmitted through said thrust means to one end of said sleeve means.

3. The combination of claim 2 wherein said lever means comprises a rigid structure member having an elongate body portion joined to an elongate leg portion, said lever means being pivotally connected to said thrust means generally at the junction of said body portion and said leg portion, said force being applied to one end of said body portion, one end of said leg portion acting as a fulcrum for said lever means.

4. The combination of claim 3 wherein a line drawn from said one end of said body portion to said pivot and a line drawn from said one end of said leg portion to said pivot intersect at said pivot at an angle of less than 180° moving from said body portion toward said leg portion in a direction substantially opposite of said force.

5. The combination of claim 3 wherein said release means comprises retainer means stationarily affixed relative to said body member, said leg portion bearing against said retainer means as said fulcrum when said force is applied to said body portion to cause said thrust means to transmit said increased proportion force to said one end of said sleeve means.

6. A remotely positionable and removable connection apparatus adapted to make connection with the top of a wellhead assembly located beneath the surface of a body of water, comprising
   a body member having an opening therethrough and a downwardly facing annular surface adapted to rest on a correlative upwardly facing surface of said top of a wellhead assembly,
   latch means carried by said body member movable to an operative position cooperating with latch engaging means carried by said top of a wellhead assembly to hold said body member to said top of a wellhead assembly, and
   latch locking means carried by said body member for holding said latch means in said operative position, wherein the improvement comprises release means carried by said body member adapted to transmit a force, applied to said release means, to said latch locking means in a predetermined increased proportion to release said latch means for movement from said operative position, said release means comprising lever means adapted so that when said force is applied to a portion of said lever means a mechanical advantage accrues to another portion of said lever means to produce said increased proportion force to release said latch means.

7. The combination of claim 6 wherein said release means comprises thrust means pivotally connected to said lever means, said force being applied to said lever means and said increased proportion force being transmitted through said thrust means to said latch actuating means.

8. The combination of claim 7 wherein said release means also comprises retainer means stationarily mounted on said body member, said lever means and said thrust means being mounted for limited movement relative thereto, a portion of said lever means bearing against said retainer means.

9. The combination of claim 6 wherein said latch locking means comprises wedge means slidable to a point behind said latch means wedging said latch means in said operative position, said release means being adapted to transmit said increased proportion force to said wedge means for moving said wedge means away from said point to release said latch means for said movement from said operative position.

10. A remotely positionable and removable connection apparatus adapted to make connection in a fluidtight manner with the top of a wellhead assembly located beneath the surface of a body of water, comprising
    a body member having an opening therethrough and a downwardly facing annular surface adapted to rest on a correlative upwardly facing surface of said top of a wellhead assembly,
    latch means carried by said body member movable from an inoperative position to an operative position cooperating with latch engaging means carried by said top of a wellhead assembly to hold said body member to said top of a wellhead assembly,
    latch actuating means comprising hydraulically operable sleeve means carried by said body member for moving said latch means from said inoperative position to said operative position; and
    sealing means carried by said body member for establishing a fluidtight seal between said body member and said wellhead assembly,
    wherein the improvement comprises release means carried by said body member adapted to transmit a force, applied to a first point on a lever member of said release means from above said body of water, to said latch actuating means through a second point on said lever member, whereby a mechanical advantage accrues thereto to cause said sleeve means to release said latch means for movement to said inoperative position.

11. The combination of claim 10 wherein said release means comprises thrust means pivotally connected to said lever member, said force being applied to said lever means and said increased proportion force being transmitted through said thrust means to one end of said sleeve means.

12. The combination of claim 10 wherein said release means comprises an annular retainer ring stationarily mounted relative to said body member, an annular thrust ring mounted for limited movement relative to said body member said lever means being in contact with said thrust ring at said second point, a portion of said lever bearing against said retainer ring, said increased proportion force being transmitted through said thrust ring to one end of said sleeve means to cause said sleeve means to move to a position releasing said latch means for movement to said inoperative position.

13. The combination of claim 12 wherein said lever member comprises a body portion and a leg portion joined generally at said second point, the end of said body portion opposite said junction being provided with means for applying said force, the end of said leg portion opposite said junction bearing against said retainer ring acting as a fulcrum for said lever means.

14. The combination of claim 13 wherein lines drawn from said junction to said point of application of said force on said body portion and to said fulcrum point of said leg portion intersect at an angle of less than 180° when moving from said body portion to said leg portion in a direction generally opposite said applied force.

References Cited

UNITED STATES PATENTS

| | | | |
|---|---|---|---|
| 3,096,999 | 7/1963 | Ahlstone et al. | 285—315 X |
| 3,135,363 | 6/1964 | Bourassa. | |
| 3,298,092 | 1/1967 | Dozier et al. | 285—18 X |
| 3,321,217 | 5/1967 | Ahlstone | 285—18 |
| 3,325,190 | 6/1967 | Eckert et al. | 285—315 X |

DAVID J. WILLIAMOWSKY, Primary Examiner

D. W. AROLA, Assistant Examiner

U.S. Cl. X.R.

166—0.6; 285—315, 320, 351